United States Patent
Vajravel (10) Patent No.: US 9,904,475 B2
(45) Date of Patent: Feb. 27, 2018

(54) SYSTEMS AND METHODS FOR SETTING THE OPERATING SYSTEM PROPERTIES FOR A STORAGE DEVICE

(71) Applicant: Dell Products L.P., Round Rock, TX (US)

(72) Inventor: Gokul Thiruchengode Vajravel, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 289 days.

(21) Appl. No.: 14/833,362

(22) Filed: Aug. 24, 2015

(65) Prior Publication Data
US 2017/0060415 A1    Mar. 2, 2017

(51) Int. Cl.
*G06F 3/06* (2006.01)
(52) U.S. Cl.
CPC .............. *G06F 3/061* (2013.01); *G06F 3/067* (2013.01); *G06F 3/0659* (2013.01)
(58) Field of Classification Search
CPC .............................. G06F 3/0659; G06F 3/0661
See application file for complete search history.

(56) References Cited

U.S. PATENT DOCUMENTS

| | | | | |
|---|---|---|---|---|
| 7,024,593 B1 * | 4/2006 | Budd | ................................ | 714/48 |
| 8,086,585 B1 * | 12/2011 | Brashers | ............ | G06F 17/30097 707/705 |
| 2003/0084209 A1 * | 5/2003 | Chadalapaka | ........ | G06F 3/0601 710/5 |
| 2004/0073703 A1 * | 4/2004 | Boucher | ................ | H04L 69/16 709/245 |

OTHER PUBLICATIONS

SCSI Miniport drivers, https://msdn.microsoft.com/en-us/library/windows/hardware/ff565309(v=vs.85).aspx.
Storport driver, https://msdn.microsoft.com/en-us/library/windows/hardware/ff567541(v=vs.85).aspx.
Storport driver supported routines, https://msdn.microsoft.com/en-us/library/windows/hardware/ff567548(v=vs.85).aspx.
Types of WDM device objects, https://msdn.microsoft.com/en-us/library/windows/hardware/ff564859(v=vs.85).aspx.
IoSetDevicePropertyData, https://msdn.microsoft.com/en-us/library/windows/hardware/ff549704(v=vs.85).aspx.
HW_INITIALIZTION_DATA, LuExtension, https://msdn.microsoft.com/en-us/library/windows/hardware/ff557459(v=vs.85).aspx.
StorPortGetLogicalUnit, https://msdn.microsoft.com/en-us/library/windows/hardware/ff567088(v=vs.85).aspx.
SCSI_ADDRESS, https://msdn.microsoft.com/en-us/library/windows/hardware/ff565299(v=vs.85).aspx.
IRP_MN_QUERY_RESOURCSE, https://msdn.microsoft.com/en-us/library/windows/hardware/ff551710(v=vs.85).aspx.

* cited by examiner

*Primary Examiner* — Farley Abad
(74) *Attorney, Agent, or Firm* — Baker Botts L.L.P.

(57) ABSTRACT

In certain circumstances it is desirable to restrict access to a SCSI storage device (physical or virtual) to a particular user associated with a specific session identifier. By utilizing a specialized filter driver, certain operating system parameters may be set or modified even though the miniport driver cannot access the device object created by the storport driver for the storage device. The filter driver may issue custom commands to retrieve storage device specific information and use that information to set or modify one or more operating system commands to restrict the access to the storage device.

19 Claims, 4 Drawing Sheets

FIG. 5

SYSTEMS AND METHODS FOR SETTING THE OPERATING SYSTEM PROPERTIES FOR A STORAGE DEVICE

FIELD

The disclosure relates in general to managing storage devices, and in particular to setting an operating system property for a storage device by a filter driver to ensure that the storage device is only accessible by a particular user associated with a particular session identifier.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One approach to the design and implementation of information handling systems for computer networks, particularly with regard to the development of client/server applications, includes designing client applications and client terminals so that the majority of the heavily used resources are at a remote computing machine, such as a centralized server, connected via a network. The client terminals generally have minimal memory, disk storage, and processor power, but are designed under the premise that most users connected to a powerful server do not need the additional processing power. With these client terminals, the total cost of ownership is minimized, because of the reduced resources and because the clients can be centrally administered and updated from the server. As such, these client terminals are suited for a network that can handle a significant number of terminals. If the client terminals have devices attached to them, then when the client terminals are connected to the server, not only the client terminals but also the client terminals' devices can become available to the server.

Some information handling systems are coupled to one or more logical units, such as mass storage devices or storage data objects. These logical units may be physical devices, such as, hard disk drive, compact disk read only memory (CDROM), tape driver, or any other known physical storage devices. These logical units may also be virtual devices, such as, random access memory (RAM) disk, virtualized hard disk driver over a network, any other known virtualized storage device. These logical units may couple to an information handling system via small computer system interface (SCSI) and may utilize any one or more transport protocols, including, but not limited to, internal SCSI (iSCSI) and fibre channel (FC) or any other protocol known to one of ordinary skill in the art.

These logical units may be visible to all users of a server due to the inability for certain operating system specific properties associated with the logical unit to be set or modified from outside the operating system.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

A logical unit, such as, a storage device or a storage data object, may be coupled to an information handling system. The logical unit may be a physical device or a virtual device. The logical unit may also utilize any one or more transport protocols including, but not limited to, internal small computer system interface (iSCSI) and fibre channel (FC).

Frequently, devices connected to client terminals (also referred to as "clients" or "client-side devices") are virtualized on a server to provide access to the devices from user sessions on the server. The virtualized devices (or redirected devices) are accessible from a large number of user sessions and/or client terminals providing many client terminals the necessary support to fulfill a given computing function. For example, in an office environment, multiple user sessions and/or clients may be connected to a server on which the device is virtualized (or redirected), and all of the multiple user sessions and/or clients connected to the server may have access to the device.

In an information handling system running a Microsoft Windows operating system (O/S), the storport/scsiport miniport driver are used to expose the logical unit (for example, a storage device such as a hard disk drive) to the storage subsystem of the O/S. Currently, the miniport driver cannot access a device object created for a newly coupled logical unit. A need therefore exists for systems and methods that allow access to O/S properties so as to restrict the newly coupled logical unit to only the session associated with a particular user.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices (such as USB mass storage devices), one or more communications ports for communicating with external devices as well as various input and output (I/O) devices, such as a keyboard, a mouse, a wireless device, for example, a Bluetooth device, a video display, and any other device known to one of ordinary skill in the art. The information handling system may also include one or more buses operable to transmit communication between the various hardware components.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Particular embodiments are best understood by reference to FIGS. 1-5, wherein like numbers are used to indicate like and corresponding parts.

Figure 1:
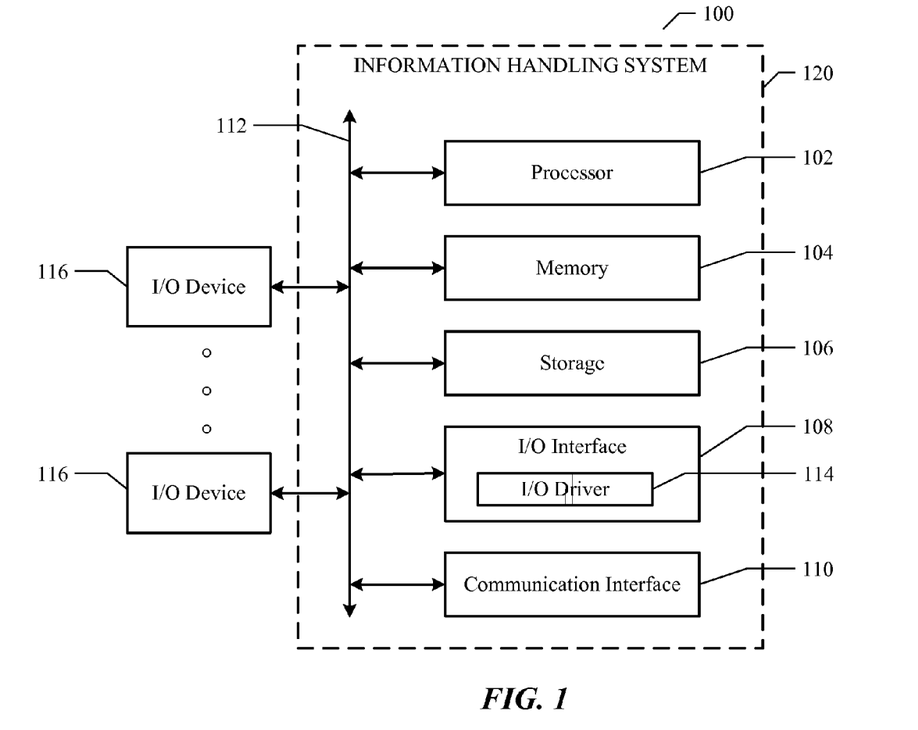
FIG. 1 is a conceptual block diagram of selected elements of an information handling system according to one embodiment of the present disclosure.

FIG. 1 illustrates a simplified diagram of information handling system configuration 100 in accordance with an aspect of the present disclosure. In particular embodiments, one or more information handling systems 120 perform one or more steps of one or more methods described or illustrated herein. In particular embodiments, one or more information handling systems 120 provide functionality described or illustrated herein. In particular embodiments, software running on one or more information handling systems 120 performs one or more steps of one or more methods described or illustrated herein or provides functionality described or illustrated herein. Particular embodiments include one or more portions of one or more information handling systems 120. Herein, reference to an information handling system may encompass a computing device, and vice versa, where appropriate. Moreover, reference to an information handling system may encompass one or more information handling systems, where appropriate.

This disclosure contemplates any suitable number of information handling systems 120. This disclosure contemplates information handling system 120 taking any suitable physical form. As example and not by way of limitation, information handling system 120 may be an embedded information handling system, a system-on-chip (SOC), a single-board information handling system (SBC) (such as, for example, a computer-on-module (COM) or system-on-module (SOM)), a desktop information handling system, a laptop or notebook information handling system, an interactive kiosk, a mainframe, a mesh of information handling systems, a mobile telephone, a personal digital assistant (PDA), a server, a tablet information handling system, a terminal, a thin client, a slim client, a lean client, or a combination of two or more of these. Where appropriate, information handling system 120 may include one or more information handling systems 120; be unitary or distributed; span multiple locations; span multiple machines; span multiple data centers; or reside in a cloud, which may include one or more cloud components in one or more networks. Where appropriate, one or more information handling systems 120 may perform without substantial spatial or temporal limitation one or more steps of one or more methods described or illustrated herein. As an example and not by way of limitation, one or more information handling systems 120 may perform in real time or in batch mode one or more steps of one or more methods described or illustrated herein. One or more information handling systems 120 may perform at different times or at different locations one or more steps of one or more methods described or illustrated herein, where appropriate.

In particular embodiments, information handling system 120 includes a processor 102, memory 104, storage 106, an input/output (I/O) interface 108, a communication interface 110, a bus 112, and an I/O driver 114. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 102 includes hardware for executing instructions, such as those making up one or more modules of a computer program, for example, software. As an example and not by way of limitation, to execute instructions, processor 102 may retrieve (or fetch) the instructions from an internal register, an internal cache, memory 104, or storage 106; decode and execute them; and then write one or more results to an internal register, an internal cache, memory 104, or storage 106. In particular embodiments, processor 102 may include one or more internal caches for data, instructions, or addresses. This disclosure contemplates processor 102 including any suitable number of any suitable internal caches, where appropriate. As an example and not by way of limitation, processor 102 may include one or more instruction caches, one or more data caches, and one or more translation lookaside buffers (TLBs). Instructions in the instruction caches may be copies of instructions in memory 104 or storage 106, and the instruction caches may speed up retrieval of those instructions by processor 102. Data in the data caches may be copies of data in memory 104 or storage 106 for instructions executing at processor 102 to operate on; the results of previous instructions executed at processor 102 for access by subsequent instructions executing at processor 102 or for writing to memory 104 or storage 106; or other suitable data. The data caches may speed up read or write operations by processor 102. The TLBs may speed up virtual-address translation for processor 102. In particular embodiments, processor 102 may include one or more internal registers for data, instructions, or addresses. This disclosure contemplates processor 102 including any suitable number of any suitable internal registers, where appropriate. Where appropriate, processor 102 may include one or more arithmetic logic units (ALUs); be a multi-core processor; or include one or more processors 102. Although this disclosure describes and illustrates a particular processor, this disclosure contemplates any suitable processor.

In particular embodiments, memory 104 includes main memory for storing instructions for processor 102 to execute or data for processor 102 to operate on. As an example and not by way of limitation, information handling system 120 may load instructions from storage 106 or another source (such as, for example, another information handling system 120) to memory 104. Processor 102 may then load the instructions from memory 104 to an internal register or internal cache. To execute the instructions, processor 102 may retrieve the instructions from the internal register or internal cache and decode them. During or after execution of the instructions, processor 102 may write one or more results (which may be intermediate or final results) to the internal register or internal cache. Processor 102 may then write one or more of those results to memory 104. In particular embodiments, processor 102 executes only instructions in one or more internal registers or internal caches or in memory 104 (as opposed to storage 106 or elsewhere) and operates only on data in one or more internal registers or internal caches or in memory 104 (as opposed to storage 106 or elsewhere). One or more memory buses (which may each include an address bus and a data bus) may couple processor 102 to memory 104. Bus 112 may include one or more memory buses, as described below. In particular embodiments, one or more memory management units (MMUs) reside between processor 102 and memory 104 and facilitate accesses to memory 104 requested by processor 102. In particular embodiments, memory 104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 104 may include one or more memories 104, where appropriate. Although this disclosure describes and illustrates particular memory, this disclosure contemplates any suitable memory.

In particular embodiments, storage 106 includes mass storage for data or instructions. As an example and not by way of limitation, storage 106 may include a hard disk drive (HDD), a floppy disk drive, flash memory, an optical disc, a magneto-optical disc, magnetic tape, or a USB drive or a combination of two or more of these. Storage 106 may include removable or non-removable (or fixed) media, where appropriate. Storage 106 may be internal or external to information handling system 100, where appropriate. In particular embodiments, storage 106 is non-volatile, solid-state memory. In particular embodiments, storage 106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 106 taking any suitable physical form. Storage 106 may include one or more storage control units facilitating communication between processor 102 and storage 106, where appropriate. Where appropriate, storage 106 may include one or more storages 106. Although this disclosure describes and illustrates particular storage, this disclosure contemplates any suitable storage.

In particular embodiments, I/O interface 108 includes hardware, software, or both, providing one or more interfaces for communication between information handling system 120 and one or more I/O devices 116. Information handling system configuration 100 may include one or more of these I/O devices 116, where appropriate. In particular embodiments, the device 116 may be a device with a USB interface for a serial port or a parallel port or both, a serial port interface, a parallel port interface, or a combination thereof. One or more of these I/O devices 116 may enable communication between a user (such as a person, administrator, another device or information handling system) and information handling system 120. As an example and not by way of limitation, an I/O device 116 may include a wireless device (such as a Bluetooth device or a USB device), a logical unit, such as, a mass storage device, a keyboard, keypad, microphone, monitor, mouse, printer, facsimile, scanner, speaker, still camera, stylus, tablet, touch screen, trackball, video camera, another suitable I/O device 116 or a combination of two or more of these I/O devices 116. An I/O device 116 may include one or more sensors. This disclosure contemplates any suitable I/O devices 116 and any suitable I/O interfaces 108 for them. Where appropriate, I/O interface 108 may include one or more I/O drivers (such as device or software drivers) 114 enabling processor 102 to drive one or more of these I/O devices 116. I/O interface 108 may include one or more I/O interfaces 108, where appropriate. Although this disclosure describes and illustrates a particular I/O interface, this disclosure contemplates any suitable I/O interface.

In particular embodiments, communication interface 110 includes hardware, software, or both for providing one or more interfaces for communication (such as, for example, packet-based communication) between information handling system 120 and one or more other information handling systems 120 or one or more networks. As an example and not by way of limitation, communication interface 110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 110 for it. As an example and not by way of limitation, information handling system 120 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 120 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Information handling system 120 may include any suitable communication interface 110 for any of these networks, where appropriate. Communication interface 110 may include one or more communication interfaces 110, where appropriate. Although this disclosure describes and illustrates a particular communication interface, this disclosure contemplates any suitable communication interface.

In particular embodiments, bus 112 includes hardware, software, or both coupling components of information handling system 120 to each other. As an example and not by way of limitation, bus 112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 112 may include one or more buses 112, where appropriate. Although this disclosure describes and illustrates a particular bus, this disclosure contemplates any suitable bus or interconnect.

Figure 2:
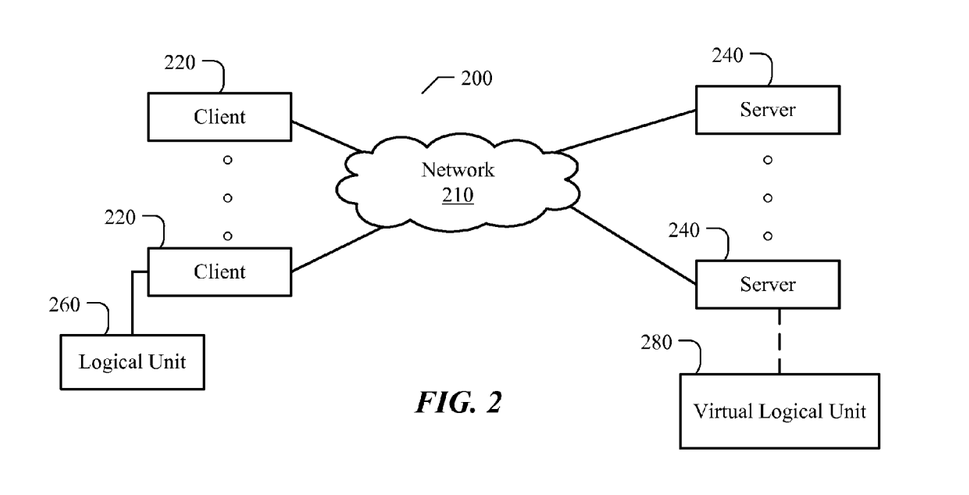
FIG. 2 is a conceptual block diagram of selected elements of a computer network environment according to one embodiment of the present disclosure.

FIG. 2 is a conceptual block diagram of selected elements of a computer network environment 200 according to an aspect of the disclosure. In particular embodiments, one or more client devices 220 and one or more servers 240 are connected via network 210. Network 210 may be a public network or a private (for example, corporate) network. Additionally, network 210 may be, for example, a Local Area Network (LAN), a Wide Area Network (WAN), a wireless network, the Internet, an intranet or any other suitable type of network. One or more client devices 220 may be connected to the network 210 via a network switch (not shown). In particular embodiments, network 210 may include one or more routers for routing data between client devices 220 and/or servers 240. A device (for example, a client device 220 or a server 240) on network 210 may be addressed by a corresponding network address including, for example, an Internet protocol (IP) address, an Internet name, a Windows Internet name service (WINS) name, a domain name or other system name. In particular embodiments, network 210 may include one or more logical groupings of network devices such as, for example, one or more sites (for example, customer sites) or subnets. As an example, a corporate network may include potentially thousands of offices or branches, each with its own subnet (or multiple subnets) having many devices. One or more client devices 220 may communicate with one or more servers 240 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Client device 220 may be a desktop computer, a laptop computer, a tablet computer, a handheld device, a mobile phone, a kiosk, a vending machine, a billboard, or any suitable information handling system 120. In particular embodiments, a client device 220 is an embedded computer and may have flash memory (for example, a solid state drive) instead of a hard disk drive. In particular embodiments, a client device 220 is a thin client having limited processing capabilities and limited storage, and such a thin client may require minimal management and updates. A client device 220 may communicate with a server 240 via one or more protocols such as Hypertext Transfer Protocol (HTTP), Hypertext Transfer Protocol Secure (HTTPS), File Transfer Protocol (FTP), Common Internet File System (CIFS), Independent Computing Architecture (ICA) protocol (developed by Citrix Systems, Inc.), Remote Desktop Protocol (RDP) (developed by Microsoft Corporation), or any suitable protocol or combination of protocols.

In particular embodiments, a client device 220 may connect to a logical unit device 260. While only one logical unit 260 is shown, the present invention contemplates client device 220 connecting to any number of logical units 260. Further, the present invention contemplates any number of client devices 220 connecting to one or more logical units 260 such that multiple client devices 220 may be connected to one or more unique logical units 260. In particular embodiments, any number of client devices 220 may be connected to the same logical units 260, different logical units 260, or any combination thereof. One or more logical units 260 may include a mass storage device such as a compact disk read only memory (CDROM), hard disk driver, tape drive, or any other storage device. The logical unit 260 may be based on the small computer system interface (SCSI) with the underlying transport protocols including iSCSI, FC, or any other transport protocols known to one of ordinary skill in the art.

A server 240 may include one or more of: a computing device, a desktop computer, a laptop computer, a database, a corporate server, a repository server, a configuration application server, a domain name system (DNS) server, a dynamic host configuration protocol (DHCP) server, a virtual machine (for example, VMware® Virtual Machine), a desktop session (for example, Microsoft Terminal Server), a published application (for example, Microsoft Terminal Server), or any suitable information handling system 120. As an example, a private (for example, corporate) network may include a device manager server and a repository server each configured to communicate with multiple client devices 220 across one or more domains, sites, or subnets of network 210. In particular embodiments, a server 240 may include one or more servers, or functions of one or more servers. A client device 220 may access software resources provided by a server 240 such as, for example, operating systems, add-ons, content, or any other suitable data, applications, or images. In particular embodiments, a client 220 may access resources provided by a server 240 only after providing suitable authentication information. Alternatively, a server 240 may provide software or other resources automatically to one or more client devices 220.

It may be desirable, in the case of a private (for example, corporate) network including multiple sites or subnets to deploy software (including, for example, all or part of one or more operating systems, applications, add-ons, or data) to one or more client devices 220 across one or more sites or subnets. The client devices 220 may, for example, be located remotely from one or more servers 240 (including, for example, device managers or resource repositories).

In particular embodiments, one or more servers 240 of a network 210 may include a virtual logical unit 280, such as a random access memory (RAM) disk, a virtualized disk over network, or any other virtualized logical unit known to one of ordinary skill in the art. While the virtual logical unit 280 is not locally or physically connected to the server 240, the virtual logical unit 280 appears to the server 240 as if it is locally connected to the server 240. Thus, logical unit 260 appears to the server 240 as a virtual logical unit 280. While only one virtual logical unit 280 is shown, the present invention contemplates server 240 virtualizing and accessing any number of virtual logical units 280 that may or may not be associated with one or more logical units 260 connected to any one or more client devices 220. Further, the present invention contemplates any number of servers 240 accessing one or more virtual logical units 280 such that multiple servers 240 may access one or more virtual logical units 280. In particular embodiments, any number of servers 240 may access virtual logical units 280, different virtual logical units 280, or any combination thereof.

As used herein, a "local" device of information handling system 120, or a device "locally" connected to information handling system 120, may be a device directly connected to the system using one or more wires or connectors (for example, physically connected to the system), or a device directly connected to the system using a wireless link. For example, virtual logic unit 260 is a local device connected using a SCSI connection to client device 220. Furthermore, in one aspect of the disclosure, a local device of an information handling system 120 or a device locally connected to information handling system 120 may include a device within the information handling system 120 (for example, an internal device (not shown) of client device 220).

A "remote" device, or a device "remote" to information handling system 120, may be a device that is not directly connected to information handling system 120. For example, server 240 is remote to both client device 220 and virtual logical unit 260 because server 240 is not directly connected to client device 220 or virtual logical unit 260 but connected indirectly through network 210, which can include, for example, another server 240, or the Internet.

In particular embodiments, client device 220 (for example, a thin client, a slim client, or a lean client) or one or more software components associated with client device 220 may depend on server 240 to fulfill its computational roles. As an example of a Virtual Desktop Infrastructure (VDI) and not by way of limitation, client device 220 may provide one or more terminal services to one or more users of client device 220. As such, the users of client device 220 may login to the same server 240 and perform tasks on the same server 240 substantially at the same time. In the VDI, one or more USB devices 260 may be connected to client device 220. In particular embodiments, in order for the logical units 260 to work seamlessly, communications associated with the logical units 260 may be redirected to a Virtual Desktop (VD) operating system (OS) or a Virtual Machine (VM) OS (for example, WINDOWS SERVER 2003) of the VDI.

Figure 3:
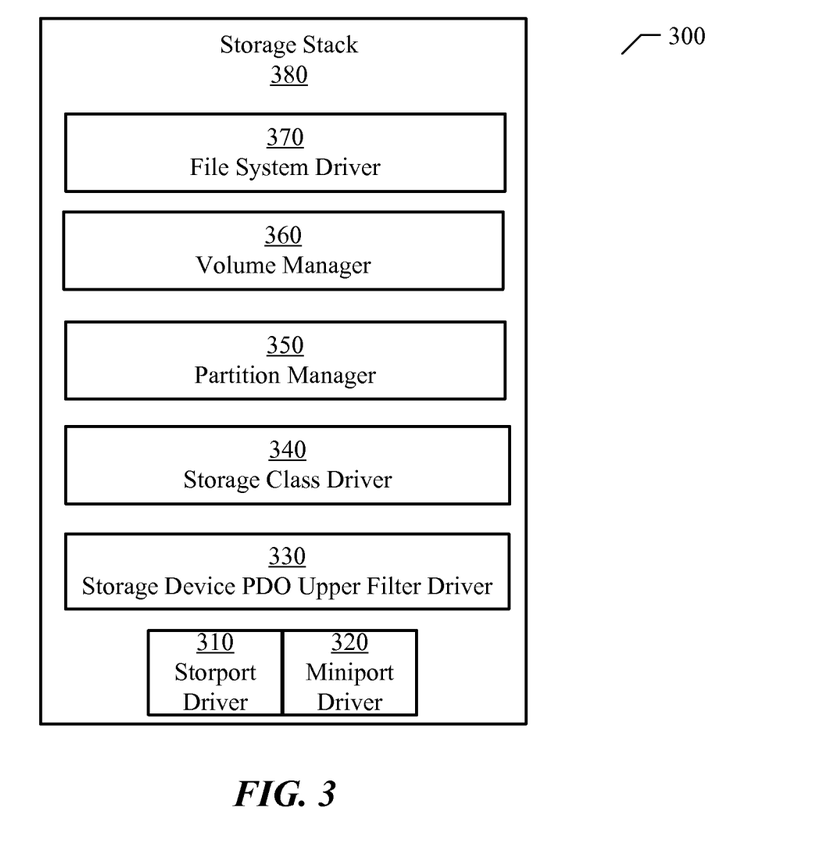
FIG. 3 is a conceptual block diagram of selected elements of a server according to one embodiment of the present disclosure.

FIG. 3 is a conceptual block diagram 300 of selected elements of a server for setting one or more O/S properties associated with a logical unit 260 or a virtual logical unit 280 according to one embodiment of the present disclosure. The server, such as server 240, is operable to run a Windows O/S. The storage stack 380 of a server 240 may exist as part of the server's kernel. The driver stack 380 may include several components that are utilized in one or more embodiments of the present disclosure, including, but not limited to, one or more standard Windows O/S drivers. The storage stack 380 may comprise a storport driver 310 (a driver provided by the hardware and/or software vendor or the Windows O/S), a miniport driver 320 (a driver provided by the Windows O/S), a storage device physical device object (PDO) upper filter driver 330, a storage class driver 340, a partition manager 350, a volume manager 360, a file system driver 370 and any other components known to one of ordinary skill in the art.

Any one or more of the elements of storage stack 380 may be provided by the Windows O/S.

The storport driver 310 is in addition to the SCSI port driver provided by the Windows O/S. The storport driver 310 is a storage port driver. When a driver for a logical unit 260 or a virtual logical unit 280 is detected, the storport driver 310 is loaded and begins communications with the miniport driver 320. The storport driver 310 obtains the miniport driver's 320 supported control types. Miniport driver 320 may be a physical or a virtual miniport driver and handles device specific data associated with the logical unit 260/virtual logical unit 280. The storport driver handles all Windows specific data, for example, creating device objects. Within the Windows O/S, all the logical units 260 and virtual logical units 280 are handled by the storport driver 310 and the miniport driver 320. For example, when the miniport driver 320 detects a logical unit 260 or virtual logical unit 280, the miniport driver 320 communicates the properties of the detected logical unit (260 and/or 280) to the storport driver. The miniport driver cannot access the device object created by the storport driver 280 and cannot set and/or modify any O/S property. For example, the miniport driver 320 cannot set the session identifier (sessionID) or any other O/S property associated with the device object.

The storage class driver handles all logical unit 260 and virtual logical unit 280 processes. The partition manager 350 manages the partitions of a logical unit 260 and/or a virtual logical unit 280. The volume manager 360 manages volume related activity associated with the logical unit 260 and/or virtual logical unit 280. The file system driver 370 handles file system processes associated with the logical unit 260 and/or the virtual logical unit 280.

Whenever the storport driver 310 creates a device object, the device object is visible to all users because the sessionID property is not settable or modifiable by the miniport driver 320. The miniport driver 320 handles only the adapter and underlying transport protocol processes. That is, the miniport driver 320 links itself with the system supplied storport driver 310, which is a kernel mode dynamic-link library, and calls only those exported routines to communicate with the O/S and the associated adapter. The miniport driver 320 cannot access certain PDO properties, including, but not limited to, sessionID, because the miniport driver 320 cannot use windows driver model (WDM) application program interface (API) and the PDO created by the storport driver 310 is not accessible.

In one embodiment according to the present disclosure, the miniport driver 320 stores the O/S specific properties when it detects a logical unit 260 (using the physical miniport driver) or a virtual logical unit 280 (virtual miniport driver) in a logical unit data structure (a logical unit (LU) extension). The LU extension is shared to other application and/or drivers via one or more custom input/output control (IOCTL) commands when the SCSI address associated with a request matches the SCSI address associated with a particular logical unit 260 or virtual logical unit 280.

A storage device PDO upper filter driver 330 layers on top of the miniport driver (physical or virtual) 320. This storage device PDO upper filter driver 330 attaches to every storage device PDO created for any of the logical units 260 or virtual logical units 280. To set any one or more of a particular logical unit 260 or virtual logical unit 280 as soon as the unit is enumerated, the storage device PDO upper filter driver 330 is utilized. When a logical unit 260 or a virtual logical unit 280 is enumerated, one or more plug-and-play (PnP) I/O request packets (IRP) are sent by the PnP manager to the storage device PDO upper filter driver 330. The storage device PDO upper filter driver 330 queries the miniport driver 320 for the properties of the associated logical unit 260 or virtual logical unit 280 using one or more IOCTL commands. The storage device PDO upper filter driver sets or modifies an associated O/S property in the same thread or function using an API, such as the IoSetDevicePropertyData API.

Figure 4:
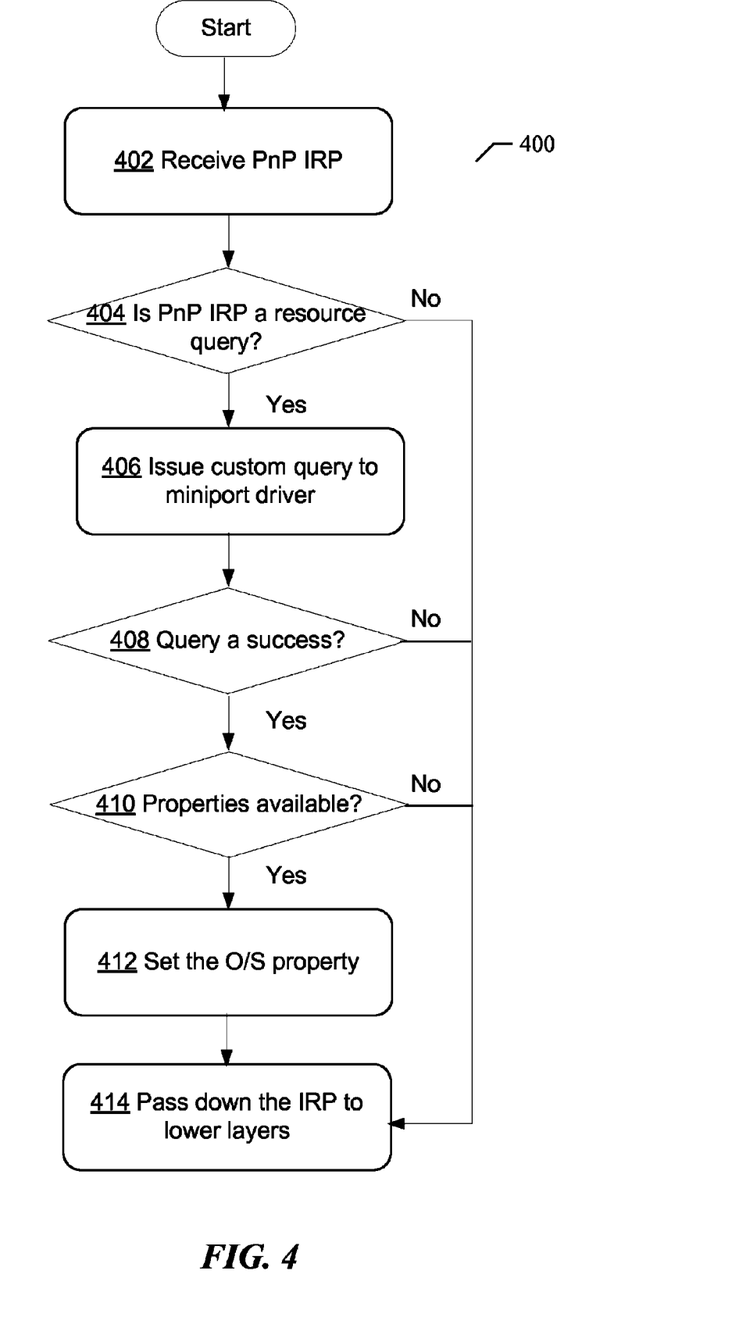
FIG. 4 is a flowchart illustrating an exemplary method for setting operating system properties for a storage device according to one embodiment of the present disclosure.

FIG. 4 is a flowchart illustrating an exemplary method for setting an O/S property for a storage device according to one or more embodiments of the present invention as shown generally at 400. Upon enumeration of a logical unit 260 or a virtual logical unit 280, the PnP manager sends PnP IRPs that are received by the storage device PDO upper filter driver 330 at step 402. The PnP IRP received by the storage device PDO upper filter driver 330 may be an IRP_MN_QUERY_RESOURCES request or other resource query known to one of ordinary skill in the art. At step 404, it is determined if the PnP IRP is a resource query. This resource query may comprise a SCSI address associated with the particular logical unit (a logical unit 260 or a virtual logical unit 280). If it is, then at step 406, a custom query is issued to the miniport driver 320 (physical miniport driver or virtual miniport driver according to the associated logical unit). The miniport driver 320 may receive a custom IOCTL command from the storage device PDO upper filter driver 330.

Figure 5:
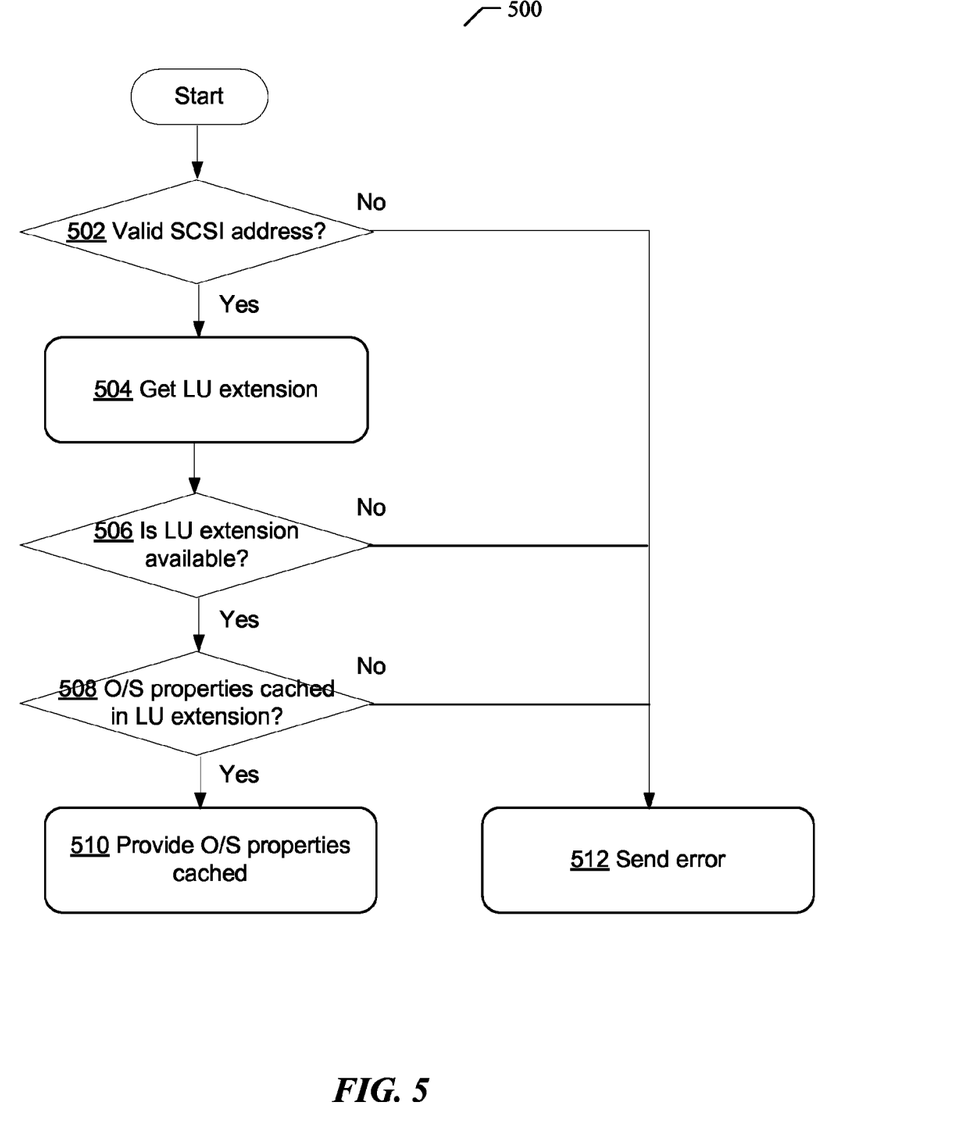
FIG. 5 is a flowchart illustrating an exemplary method for retrieving operating system properties for a storage device according to one embodiment of the present disclosure.

Issuing the custom command from the storage device PDO upper filter driver 330 may comprise several steps as illustrated generally at 500 in FIG. 5. In one embodiment, the step 406 comprises the further step at 502 of FIG. 5 of determining by the miniport driver 320 if the SCSI address associated with the PnP IRP is a valid SCSI address. It is not valid, then an error is sent by the miniport driver 320 at step 512. If it is a valid SCSI address, then at step 504, the storage device PDO upper filter driver 330 obtains the per logical unit data structure (the LU extension) for the obtained valid SCSI address. At step 506, it is determined if the LU extension is available. If the LU extension is not available, an error is sent at step 512. If the LU extension is available, then it is determined at step 508 if the O/S properties associated with the obtained SCSI address (the logical unit 260 or the virtual logical unit 280) are cached in the LU extension. If the O/S properties are not cached in the LU extension then an error is sent at step 512. If the O/S properties are cached in the LU extension, then at step 510, the cached O/S properties are provided from the miniport driver 320 to the storage device PDO upper filter class driver 330.

Returning back to step 406 of FIG. 4, the method proceeds at step 408 to determine if the custom query was successful. The customer query is successful if, as illustrated in FIG. 5, the O/S properties cached for the logical unit 260 or the virtual logical unit 280 are provided. If the O/S properties were not received, the custom query was not a success, then the O/S property cannot be set and the method continues at step 414. If the O/S properties were received, the query was a success and it is determined at step 410 if the O/S properties of interest are available are available, for example, the sessionID property. If the O/S properties are not available, the method proceeds to step 414. If the O/S properties are available, then the O/S property is set. In one embodiment, the sessionID property associated with the SCSI address is set or modified by the storage device PDO upper layer driver 330 such that only the user associated with the particular sessionID can access the logical unit 260 or the virtual logical unit 280 associated with the particular SCSI address. Next at step 414 the IRP is passed to lower layers. For example, for an IRP_MN_QUERY_RESOURCES query, the configuration resources for the I/O device 116 are sent to the PnP manager by the storport/miniport driver (310/320).

Those of skill in the art would appreciate that items such as the various illustrative blocks, modules, elements, components, methods, operations, steps, and algorithms described herein may be implemented as hardware, computer software, or a combination of both.

To illustrate the interchangeability of hardware and software, items such as the various illustrative blocks, modules, elements, components, methods, operations, steps, and algorithms have been described generally in terms of their functionality. Whether such functionality is implemented as hardware or software depends upon the particular application and design constraints imposed on the overall system. Skilled artisans may implement the described functionality in varying ways for each particular application.

In one aspect, "means," a block, a module, an element, a component or a processor may be an item (for example, one or more of blocks, modules, elements, components or processors) for performing one or more functions or operations. In one aspect, such an item may be an apparatus, hardware, or a portion thereof. In one example, an item may have a structure in the form of, for example, an instruction(s) encoded or stored on a machine-readable medium, on another device, or on a portion thereof. An instruction(s) may be software, an application(s), a subroutine(s), or a portion thereof. The instructions(s) may be for performing the function(s) or operation(s). The instruction(s) may be executable by one or more processors to perform the function(s) or operation(s). One or more processors may execute the instruction(s) by, for example, transferring or copying and instructions into an executable memory space and executing the instructions. In one example, an item may be implemented as one or more circuits configured to perform the function(s) or operation(s). A circuit may include one or more circuits and/or logic. A circuit may be analog and/or digital. A circuit may be electrical and/or optical. A circuit may include transistors. In an example, one or more items may be implemented as a processing system (for example, a digital signal processor (DSP), an application specific integrated circuit (ASIC), a field programmable gate array (FPGA), etc.), as a portion(s) of any of the foregoing, or as a combination(s) of any of the foregoing. Those skilled in the art will recognize how to implement the instructions, circuits, and processing systems.

In one aspect of the disclosure, when actions or functions (for example, hooking, modifying, intercepting, redirecting, determining, traversing, obtaining, creating, operating, deleting, removing, receiving, providing, generating, converting, displaying, notifying, accepting, selecting, controlling, transmitting, reporting, sending, or any other action or function) are described as being performed by an item (for example, one or more of blocks, modules, elements, components or processors), it is understood that such actions or functions may be performed, for example, by the item directly. In another example, when an item is described as performing an action, the item may be understood to perform the action indirectly, for example, by facilitating such an action (for example, assisting, allowing, enabling, causing, or providing for, such action to occur; or performing a portion of such an action). For example, determining can refer to facilitating determination, attaching can refer to facilitating attaching, and receiving can refer to facilitating receiving. In one aspect, performing an action may refer to performing a portion of the action (for example, performing a beginning part of the action, performing an end part of the action, or performing a middle portion of the action).

A reference to an element in the singular is not intended to mean "one and only one" unless specifically so stated, but rather "one or more." For example, a client may refer to one or more clients, a server may refer to one or more servers, an operation may refer to one or more operations, and a signal, message, or communication may refer to one or more signals, messages, or communications.

Unless specifically stated otherwise, the term "some" refers to one or more. Pronouns in the masculine (for example, his) include the feminine and neuter gender (for example, her and its) and vice versa. Headings and subheadings, if any, are used for convenience only and do not limit the invention.

A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

In one aspect, the term "coupled" or the like may refer to being directly coupled. In another aspect, the term "coupled" or the like may refer to being indirectly coupled or communicatively coupled.

Various items may be arranged differently (for example, arranged in a different order, or partitioned in a different way) all without departing from the scope of the subject technology. In one aspect of the disclosure, the elements recited in the accompanying claims may be performed by one or more modules or sub-modules. For example, a local link creation module and a local link deletion module may be combined into one module.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   receiving a resource query request by a filter driver for a detected storage device, wherein the storage device has an assigned simple computer system interface (SCSI) address;
   parsing the resource query request for a simple computer system information (SCSI) address;

issuing a custom input/out control (IOCTL) command by the filter driver to a miniport driver, wherein the IOCTL command comprises the SCSI address;
receiving one or more operating system (O/S) properties;
determining if the one or more O/S properties are available;
setting at least one of the one or more O/S properties;
passing the resource query request to one or more lower layers; and
providing to the filter driver from the miniport driver the one or more O/S properties available from a data structure of the miniport driver associated with the SCSI address.

2. The method of claim 1, further comprising:
determining if the SCSI address is valid.

3. The method of claim 1, further comprising:
retrieving, from the miniport driver, the data structure associated with the SCSI address.

4. The method of claim 3, further comprising:
determining if the data structure comprises one or more of the one or more O/S properties.

5. The method of claim 3, wherein the data structure is stored in a logical unit extension associated with the miniport driver.

6. The method of claim 1, wherein the one or more O/S properties comprises a session identifier, and wherein the step of setting comprises setting the session identifier corresponding to the SCSI address such that a device corresponding to the SCSI address is not available to any other session.

7. One or more computer-readable non-transitory storage media embodying software that is operable when executed to:
receive a resource query request by a filter driver for a detected storage device, wherein the storage device has an assigned simple computer system interface (SCSI) address;
parse the resource query request for a simple computer system information (SCSI) address;
issue a custom input/out control (IOCTL) command by the filter driver to a miniport driver, wherein the IOCTL command comprises the SCSI address;
receive one or more operating system (O/S) properties;
determine if the one or more O/S properties are available;
set at least one of the one or more O/S properties;
pass the resource query request to one or more lower layers; and
provide to the filter driver from the miniport driver the one or more O/S properties available from a data structure of the miniport driver associated with the SCSI address.

8. The media of claim 7, wherein the software when executed is further operable to:
determine if the SCSI address is valid.

9. The media of claim 7, wherein the software when executed is further operable to:
retrieve, from the miniport driver, the data structure associated with the SCSI address.

10. The media of claim 9, wherein the software when executed is further operable to:
determine if the data structure comprises one or more of the one or more O/S properties.

11. The media of claim 7, wherein the one or more O/S properties include access permissions for one or more users.

12. The media of claim 7, wherein the data structure is stored in a logical unit extension associated with the miniport driver.

13. A system comprising:
one or more processors; and
a memory coupled to the processors comprising instructions executable by the processors, the processors being operable when executing the instructions to:
receive a resource query request by a filter driver for a detected storage device, wherein the storage device has an assigned simple computer system interface (SCSI) address;
parse the resource query request for a simple computer system information (SCSI) address;
issue a custom input/out control (IOCTL) command by the filter driver to a miniport driver, wherein the IOCTL command comprises the SCSI address;
receive one or more operating system (O/S) properties;
determine if the one or more O/S properties are available;
set at least one of the one or more O/S properties;
pass the resource query request to one or more lower layers; and
provide to the filter driver from the miniport driver the one or more O/S properties available from a data structure of the miniport driver associated with the SCSI address.

14. The system of claim 13, wherein the processors are further operable when executing instructions to:
determine if the SCSI address is valid.

15. The system of claim 13, wherein the processors are further operable when executing instructions to:
retrieve, from the miniport driver, the data structure associated with the SCSI address.

16. The system of claim 15, wherein the processors are further operable when executing instructions to:
determine if the data structure comprises one or more of the one or more O/S properties.

17. The system of claim 13, wherein the one or more O/S properties include access permissions for one or more users.

18. The system of claim 13, wherein the data structure is stored in a logical unit extension associated with the miniport driver.

19. The system of claim 13, wherein the one or more O/S properties comprises a session identifier, and wherein the step of setting comprises setting the session identifier corresponding to the SCSI address such that a device corresponding to the SCSI address is not available to any other session.

* * * * *